July 1, 1941. H. WEBER 2,247,593
DEVICE FOR EXHIBITING AND SHIPPING PROSPECTUSES AND LIKE
PRINTED MATTER, SAMPLES, AND THE LIKE
Filed Jan. 31, 1938 3 Sheets-Sheet 1
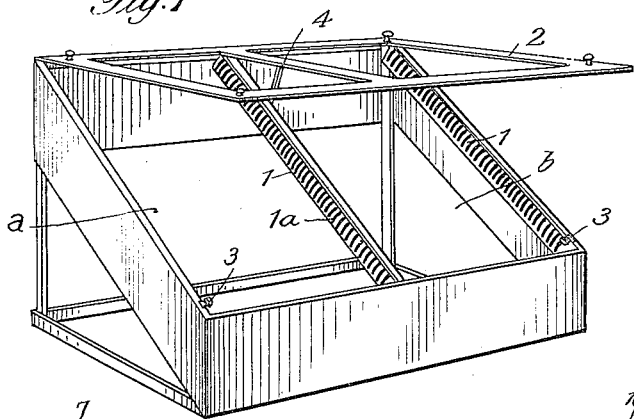
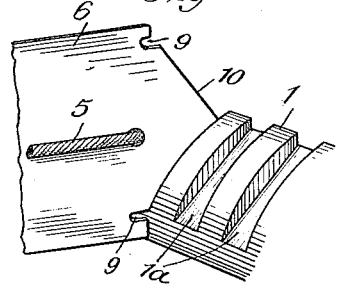
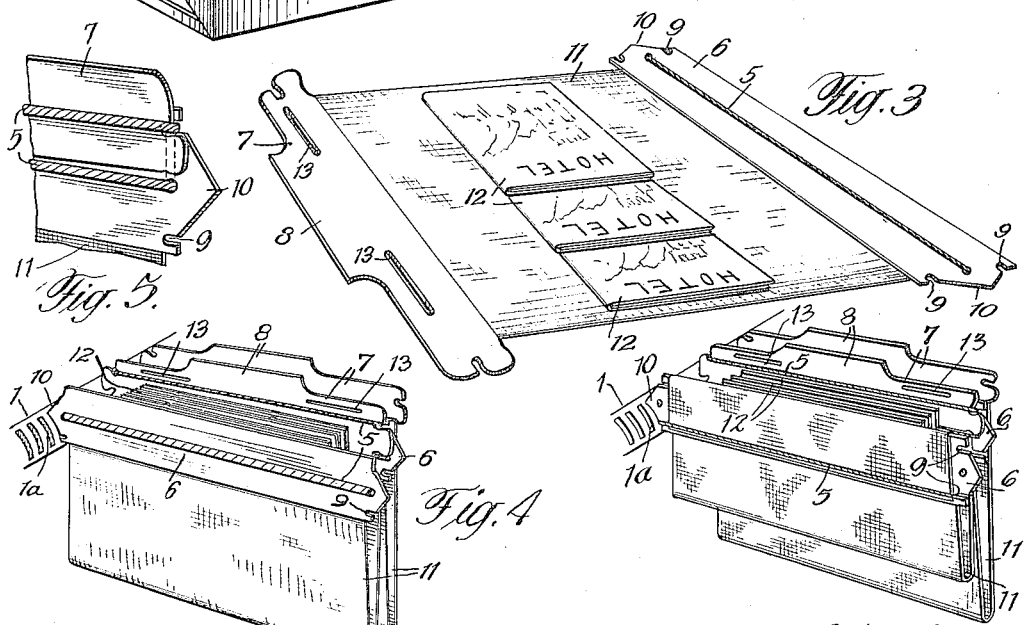
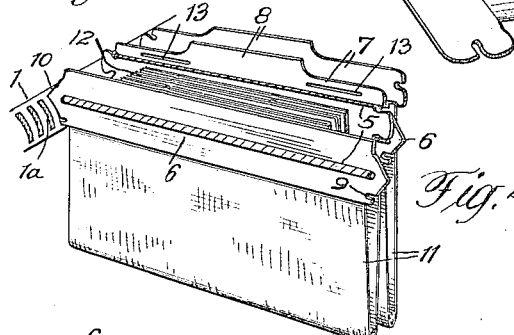
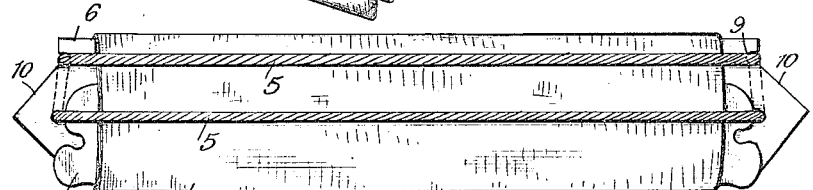
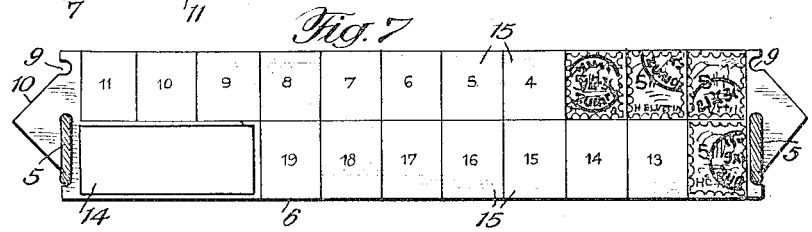
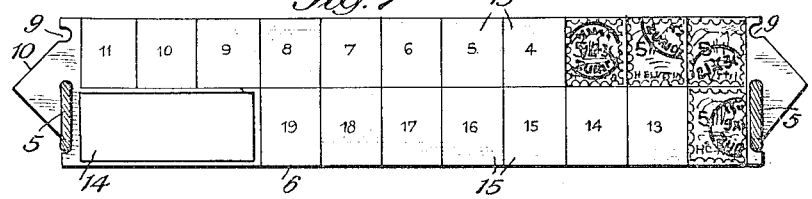
Inventor:
Henry Weber
By Sommers & Young
Attys

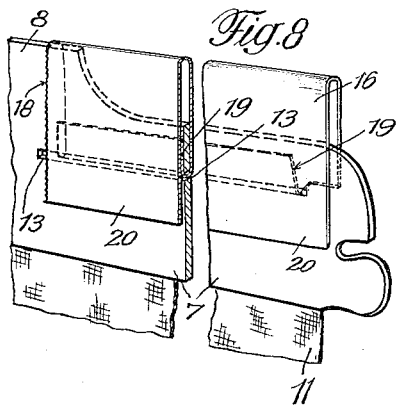
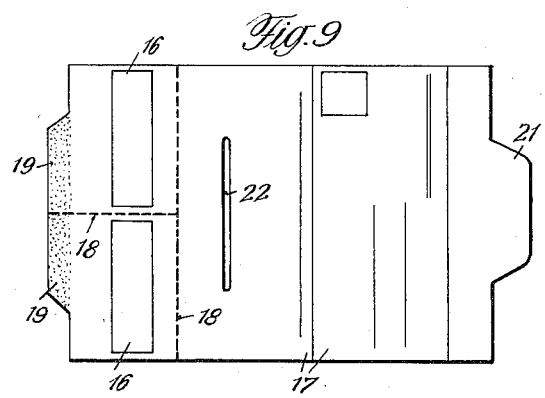
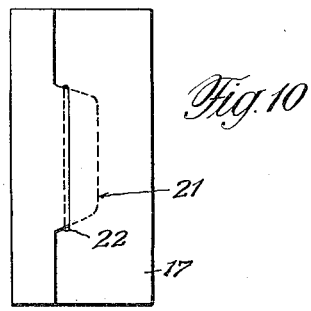
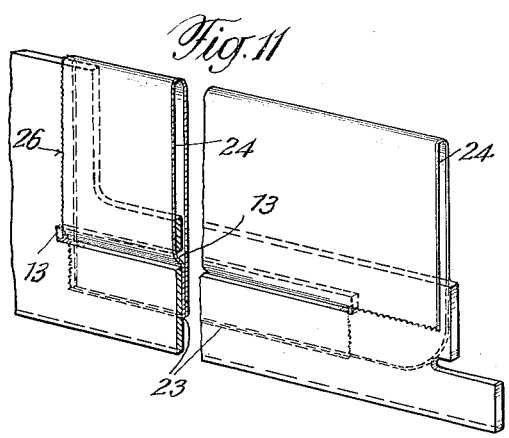
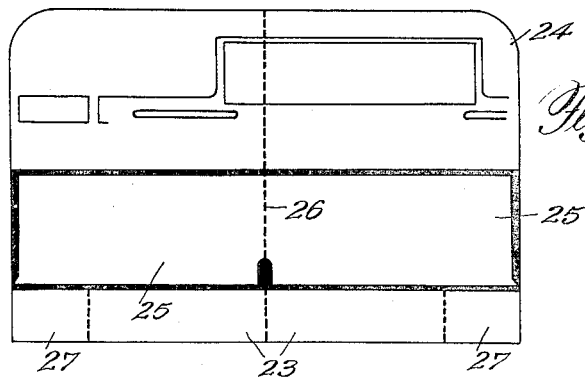

July 1, 1941. H. WEBER 2,247,593
DEVICE FOR EXHIBITING AND SHIPPING PROSPECTUSES AND LIKE
PRINTED MATTER, SAMPLES, AND THE LIKE
Filed Jan. 31, 1938 3 Sheets-Sheet 3
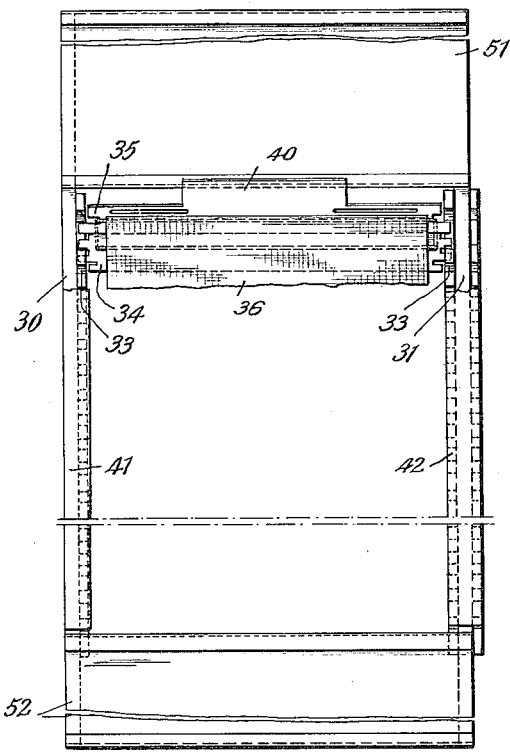
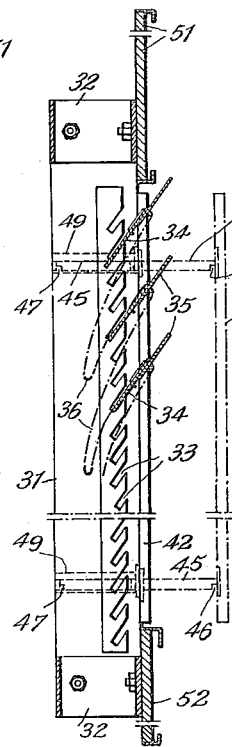
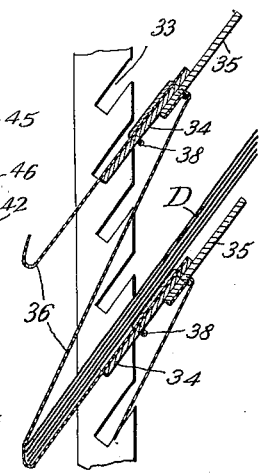
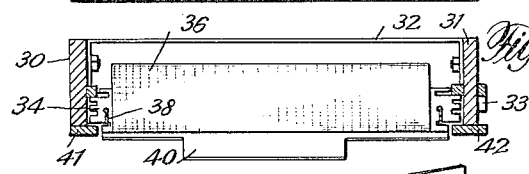
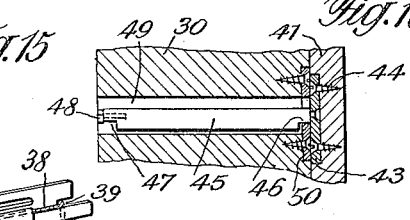
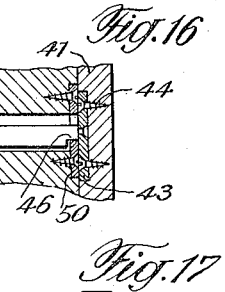
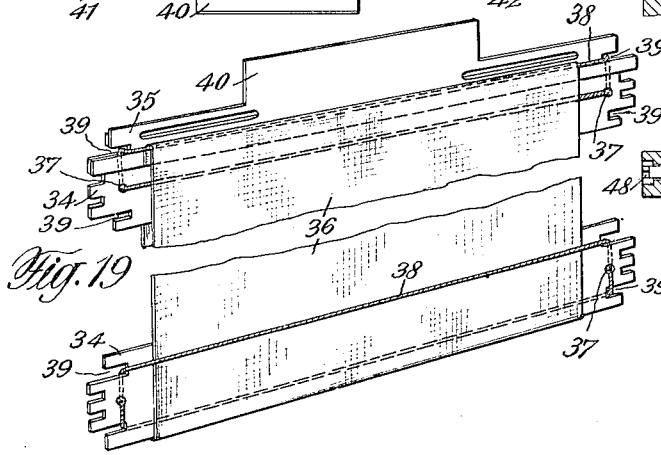
Inventor:
Henry Weber
By Sommers & Young
Attys Patented July 1, 1941

2,247,593

UNITED STATES PATENT OFFICE 2,247,593

DEVICE FOR EXHIBITING AND SHIPPING PROSPECTUSES AND LIKE PRINTED MATTER, SAMPLES, AND THE LIKE

Henry Weber, Zurich, Switzerland

Application January 31, 1938, Serial No. 187,988
In Switzerland February 5, 1937

1 Claim. (Cl. 129—16)

This invention relates to devices for exhibiting and shipping prospectuses and like printed matter, samples and the like.

There are known devices, such as suspended filing devices, comprising flat paper wrappers for the reception of printed matter or the like. Such paper wrappers surround the printed matter completely and are thus unsuitable for exhibiting their content. Furthermore, there is no possibility of varying the size of the wrappers, so that the latter are adapted to receive only a limited number of brochures or like printed matter.

There are other known suspended filing devices which are formed by a plurality of individual folders which are connected to each other and each of which consists of a folded over strip of cardboard. The length of the cardboard strips and, consequently, the height of these folders cannot be varied, so that these filing devices are suitable for receiving only a certain size of form blanks, but not for accommodating brochures of different sizes. Moreover, such folders are unsuitable for packaging and shipping printed matter.

The device for exhibiting and shipping prospectuses and like printed matter, samples and the like, according to the present invention, is distinguished from these known suspended filing devices by holders or pouches which are composed of one or more flexible strips provided at both ends with edge rails and which, when the edge rails are mounted directly or indirectly on a rack, form a folder for exhibiting printed matter and the like and, when wrapped about the printed matter, are adapted to form a package for shipping the latter, whereby the size of the pouches can be varied by winding the flexible strip about one of the edge rails.

This possibility of varying the size of the pouches is of great advantage, for example, for devices serving particularly for exhibiting prospectuses, since by reducing the length of the folders the prospectuses exhibited can be exposed to view for public inspection more or less as desired, and, in case a folder is empty, this will be readily discerned. Due to the fact that the device may serve at the same time as a packing means for a new supply of prospectuses, considerable savings in time and cost are obtained, since the necessity for employing a separate packing material is obviated. Such a pouch can be made very strong and thus can be used any number of times.

Advantageously, one of the edge rails is provided with one or more elastic tightening members which, on the one hand, secure the prospectuses against dropping out of the package and serve for connecting the edge rails of the holders or pouches to each other while exhibiting the prospectuses. The edge rails may be provided at both ends with recesses or teeth, in such a way, that the elastic tightening member is retained by the same, for example, during the packing of the prospectuses and while the edge rails of the holders are connected to each other.

Advantageously, for forming a folder, an edge rail provided with a tab carrier of one holder is set on the other kind of edge rail of another, like holder, so that the tab carrier is exposed and is plainly visible when the prospectuses, brochures or other printed matter are exhibited. Furthermore, the edge rail provided with a tab carrier may be provided at both ends of this carrier with perforations for inserting an indicator card which may be in the form of a half of a postal card and may provide an enlargement of the tab carrier. In this way, for example, messages arriving from outside, that is, announcements may be reported on the original postcard.

The rack may be provided with supporting bars for receiving the ends of the edge rails as well as locking bars which, in their locking position, prevent the edge rails from being removed, but allow the removal of the edge rails, when retracted into inoperative position.

In the accompanying drawings two embodiments of the invention are illustrated by way of example only, in which Fig. 1 is a perspective elevational view of a first constructional form of a rack according to the invention;

Fig. 2 is a larger scale perspective view of a detail showing the manner in which the edge rails of the holders engage into notches in a supporting bar of the rack;

Fig. 3 is a view of a holder in unfolded condition;

Fig. 4 is a perspective view of a series of holders brought into the form of exhibiting folders;

Fig. 4a is a perspective view of a series of wrappers serving as dispensing holders in a rack, part of the rack being omitted.

Fig. 5 is a perspective view showing the manner in which two adjoining edge rails of adjacent holders interengage;

Fig. 6 is an elevational view of an empty holder in condition for shipping;

Fig. 7 shows a front elevation of Fig. 6 provided with effaced postage stamps;

Fig. 8 is a perspective view of an edge rail provided with a tab carrier and having an indicator tab fastened thereto;

Fig. 9 is a view of a perforated information card from which indicator tabs can be detached;

Fig. 10 shows an elevation of the information card in condition for shipping;

Fig. 11 is a perspective view of an edge rail provided with a tab carrier and having a modified indicator tab fastened thereto;

Fig. 12 shows an elevation of the modified information card;

Fig. 13 shows an elevation of a second embodiment of the invention;

Fig. 14 is a vertical section of Fig. 13;

Fig. 15 is a horizontal section of Fig. 13;

Fig. 16 is a fragmentary longitudinal section of a supporting bar and an associated locking bar;

Fig. 17 is a horizontal section of Fig. 16;

Fig. 18 shows a detail of Fig. 14 on a larger scale, and

Fig. 19 is a perspective elevational view of a folder, the edge rail thereof provided with a tab carrier being secured in superposed position on the other kind of edge rail of another, like folder.

The constructional form of the rack for prospectuses and like printed matter, as shown in Figs. 1 and 2 is provided with a body $a, b$ which is of a suitable collapsible or detachable construction, so that it can be conveniently transported. The frame is subdivided into two parts, each part comprising two longitudinally inclined supporting bars 1 which are arranged on the opposite ends thereof. The bars 1 are provided with transverse, vertically extending slots $1a$ for a purpose which will presently appear. To the rack body $a, b$ a frame 2 is pivotally connected, this frame having retaining members which extend longitudinally of the supporting bars and constitute locking bars for locking the ends of the rails of the containers in the slots $1a$ of the bars 1. This frame is, advantageously, secured in locking position by a locking device which may be controlled by means of a push button 3 or other control member, such as a key, which is invisible from outside, so that the frame can be opened only by means of this control member. Furthermore, an adjustable stay 4 is provided on the rack body $a, b$ for supporting the frame 2 in the open position.

The holders for the printed matter are formed by a flexible strip 11 the ends of which are provided with flat edge rails 6, 7 respectively. These rails are made of a strong light weight material, for example, maple or other wood, or of a light metal, an artificial material, such as Celluloid, artificial resin, cardboard or the like, whereas the strip 11 may consist, for example, of fabric. An elastic tightening member, such as a band 5 of braided rubber strands, is passed through holes in the rails 6. Instead of only one, several elastic tightening members may be provided and may, for example, be fastened to the rail by their ends. The edge rail 7 is provided with a tab 8 which may be inscribed, or, conveniently, may have labels, individual characters, letter press, or else carbon or other copies attached thereto, in order to obtain uniformity of lettering. The two rails 6, 7 are provided with recesses 9 into which the rubber band is adapted to engage so as to be retained in position (Figs. 4 to 7). The rail 6 is provided at the ends with edges 10 which taper into a point and which bear against mating bottoms of the slots $1a$ of the supporting bars 1, when the rails 6 are inserted in said slots.

In Fig. 4 the packages are shown mounted in the slots of supports 1, the flexible strips forming pouches for holding the printed matter.

In Fig. 4a the flexible strips are shown wound about one of the edge rails to shorten the strip and reduce the depth of pouch formed according to the size of the printed matter to be held by the respective pouches. The strips are prevented from unwinding by the flat edge rails engaging in the slots $1a$ which are too narrow to allow the flat rails to turn, so that no other special means for preventing unwinding is required.

The edge rail 7 of a holder can be connected to the rail 6 of another holder by means of the rubber band engaging into the recesses 9, in the manner shown in Fig. 5. Thus, a plurality of holders can be set on the supporting bars 1 in the form of folders by inserting the rails 6 directly in the slots $1a$ of the bars 1, while the rails 7 are connected to the adjacent rails 6 of the successive holders, in which way the holders are mounted on the rack directly.

In the condition of the holder shown in Fig. 3 the strip 11 can be folded about the printed matter placed thereon, for example propaganda material 12, in such manner, that the rail 6 is superposed on the rail 7. Thereupon the rubber band 5 is slung about the whole wrapper then forming a package, so that the band is retained in the outermost recesses 9 of the rail 6. The two side faces of the rail 6 are each provided with a space 14, for an address, and numbered spaces 15 for the affixing of stamps (Fig. 7), so that the holder is in condition for posting after having been folded about the printed matter.

As shown in Figs. 6 and 7, an empty packing means can be formed by winding the strip 11 on the rail 7 and passing the rubber band 5 about the whole, for the purpose of returning the holder in order to be resupplied with printed matter. The strip 11 is of such a length that after it has been wound on the rail 7 the latter underlies the rail 6 so as to register therewith exactly. The address 14 on one side face of the rail 6 serves for posting the empty holder and the address 14 on the other side face of the rail 6 for posting the filled holder.

The edge rail 7 is provided at both ends of the tab 8 with perforations 13 (Figs. 3 and 8). A gummed flap 19 of an indicator tab 16 can be inserted into each of these perforations 13 from the rear to the front. This tab 16 is folded over the top of the rail 7, in such manner, that the information comes to lie on the front side of the rail 7 adjacent to the tab 8. The portion of the indicator tab situated on the other side of the rail 7 is pasted together with the flap 19. By this means the indicator tab can be completely removed again from the rail 7, at any time. Apart from the space for the information there is yet a space 20 on the indicator tab which is provided with the date on which the information becomes void.

As shown in Fig. 9, two indicator tabs 16 form together a part of an information card 17 which can be detached from the latter along a line of perforations 18, whereas the card can be folded into the form of a letter which is closed by inserting a flap 21 in a slot 22 (Fig. 10). This information letter is provided with an address in the usual manner.

As shown in Fig. 11, a gummed flap 23 of an indicator tab 24 is inserted into a perforation 13 of the edge rail 7 from front to rear and pasted together with the portion of the indicator tab situated on the backside of the rail 7. This arrangement has the advantage that the edge of the indicator tab is removed from the lower portion of the front face of the rail. This indicator tab 24 forms together with another tab of this kind, which may be inserted in the second perforation of the rail, a postcard as shown in Fig. 12. The surface 25 within the black margin is reserved for writing information thereon. The address is written on the backside of the postcard. On receipt of such a postcard at a place where the prospectuses are put on display it is separated in two halves each of which forms an indicator tab. After the corners 27 have been torn off, the gummed flap 23 can be inserted in a perforation 13 and pasted on (Fig. 11).

In the embodiment of the invention shown in Figs. 13 to 19 the rack is provided with two vertical supporting bars 30, 31 which are interconnected at top and bottom by cross bars 32 and are provided with oblique notches 33. The width of the notches 33 is such that they are adapted to receive an edge rail 34. Each rail 34 is secured to one end of a strip of textile fabric or rubber the other end of which carries a rail 35. An endless rubber band 38 is passed through holes 37 in the rails 34 and both rails 34, 35 are provided at their ends with recesses 39. Thus, each rail 35 can be connected to a rail 34 which is carried by an adjacent strip 36 by passing the rubber band 38 thereabout, as shown in Fig. 13. By inserting the rails 34 in the notches 33 (Figs. 14, 15) and connecting the rails 35 to the rails 34 folders for the reception of printed matter D (Fig. 18), samples or sundries can be formed by means of the strips 36. The rails 35 are provided with a tab carrier 40 for indicating the content of the respective holder. Alternatively, the ends of the rails 34 may be devoid of central teeth.

The strip 36 is so attached to the side face of the rail 35 that, when the rail 35 is attached as in Fig. 18 to the rail 34, the strip overlies the rubber band 38 (Fig. 19), so that the content of the holder is prevented from tangling with the rubber band 38 while being taken out of the holder. The holder formed by the rails 34, 35 and the strip 36 can be used for shipping printed matter and the like in a manner similar to that described in connection with the embodiment shown in Figs. 1 to 9.

In front of each supporting bar 30, 31 a retaining bar 41, 42 respectively is arranged, in recesses in the inner faces of which bearing plates 43 are arranged and secured to these bars by means of screws 44. To each bearing plate 43 a guide bolt 45 of rectangular cross section is riveted which is provided at the end by which it is connected to the bearing plate with a notch 46 and at its outer end with a notch 47. On the outer end of the bolt 45 a screw nut 48 is screwed (Figs. 16, 17). Bores 49 are provided in the supporting bars for the reception of the guide bolts 45 of the locking bars 41, 42, the front end of these bores being partially closed by guide plates 50 each of which has a central slot for guiding the respective bolt 45. In the locking position of the supporting bars 41, 42 the guide bolts 45 rest against the guide plates 50 with the bottoms of the notches 46 (Fig. 16), so that the locking bars are securely retained in these positions in which they overlie the end portions of the rails 34, 35, in order to prevent the rails from being removed from the rack in this position of the locking bars.

In order to retract the locking bars 41, 42 from the locking position into the chain-dotted position shown in Fig. 14, in which they are spaced from the edge rails of the holders, the locking bars must first be raised to such an extent that the guide plates 50 clear the notches 46 completely. Thereupon, the locking bars 41, 42 can be retracted from the rack. In the retracted position the guide plates 50 engage into the notches 47 of the guide bolts 45 so that the locking bars 41, 42 are secured in the retracted position from disengagement with the rack, by the nuts 48 forming a terminal shoulder on the bolts 45 (Fig. 16). With the bars 41, 42 assuming the retracted position, the rails 34, 35 can be removed from the notches 33. For returning the locking bars 41, 42 into locking position they must first be raised.

The supporting bar 30 is provided with notches 33 only on the inner side thereof, whereas the supporting bar 31 has notches on the inner and outer side, so that the rack can be enlarged towards the right by means of additional supporting bars 31. The width of the locking bar 42 is such that, in the locking position, this bar overlies the notches located on both sides of the supporting bar 31, that is the end portions of the edge rails of the folders engaging into these notches.

The rack is provided above and below with facings 51, 52 which are connected to the cross members 32 and serve for displaying advertisements.

The supporting bars 1, 30, 31 of the rack may be horizontal instead of being obliquely or vertically disposed as herein disclosed.

By means of the holders according to the invention, editors and publishers of printed matter, such as prospectuses or the like, can put the printed matter on show, in a proper display, for public inspection, during any desired length of time and at any place they may choose and under suitable headings written on the tab carriers, while by means of the indicator tabs next to the headings any additional information of interest to guests, clients, and so forth, may be publicized according to requirements. This information may include communications of such nature as to arouse the interest of the public taking and handling prospectuses also and which, owing to their unexpected occurrence or transitory character, cannot be mentioned in the prospectus itself, such as reports on changes in prices or of domicile, bargain sales, or else news specifically intended for attracting travelers, among which are announcements of sporting events, etc., special festivities, weather reports or the like.

Instead of providing the holder with a single flexible strip, two or more strips may be applied to the edge rails of each holder alongside of each other.

Various changes and modifications may be made in the practice of my invention without departing from the principle or spirit thereof, by adding customary practice and established knowledge of the art to the present disclosure and the scope of the appended claims is not to be regarded as limited except as specified therein.

What I claim is:

A mailing wrapper for printed display sheets, samples and the like comprising a flexible strip having an edge rail at each end, said strip being adapted to be wrapped around the said sheets, the size of the wrapper being variable to suit the size of the contents by winding part of the strip on one of the edge rails, one of said edge rails of the wrapper being provided with a display tab, and an elastic strip secured on the edge rail having the tab for securing the contents of its wrapper against dropping out and for connecting the rail to which it is secured to an edge rail at the opposite end of another wrapper with the display tab projecting above the rails so as to be visible, the elastic strip being secured to its edge rail beneath the flexible strip so as to be covered thereby so that the contents of the wrapper is prevented from becoming tangled with the elastic strip when being removed from the wrapper.

HENRY WEBER.